United States Patent [19]

Nussdorfer et al.

[11] Patent Number: 4,509,333
[45] Date of Patent: Apr. 9, 1985

[54] BRAYTON ENGINE BURNER

[75] Inventors: Theodore J. Nussdorfer, Nashua; James B. Kesseli, Milford, both of N.H.

[73] Assignee: Sanders Associates, Inc., Nashua, N.H.

[21] Appl. No.: 485,360

[22] Filed: Apr. 15, 1983

[51] Int. Cl.³ .............................................. F02C 7/00
[52] U.S. Cl. .................... 60/723; 60/203.1; 60/641.14
[58] Field of Search .............. 60/39.281, 723, 203.1, 60/641.14

[56] References Cited

U.S. PATENT DOCUMENTS

| 3,928,961 | 12/1975 | Pfefferle | 60/723 |
| 3,975,900 | 8/1976 | Pfefferle | 60/723 |
| 4,167,856 | 9/1979 | Seidel et al. | 60/39.33 |

Primary Examiner—Louis J. Casaregola
Attorney, Agent, or Firm—Louis Etlinger; Richard I. Seligman

[57] ABSTRACT

A heating chamber for supplying heated air in a Brayton engine or gas turbine plant including a compressor and turbine. The heating chamber includes a solar energy receiver that receives solar energy, converts it to heat, and heats air from the compressor. To supply additional energy that may be required for the turbine, fuel is injected into the air stream and a catalyst downstream of the solar receiver reacts the fuel with the air to provide additional energy.

4 Claims, 1 Drawing Figure

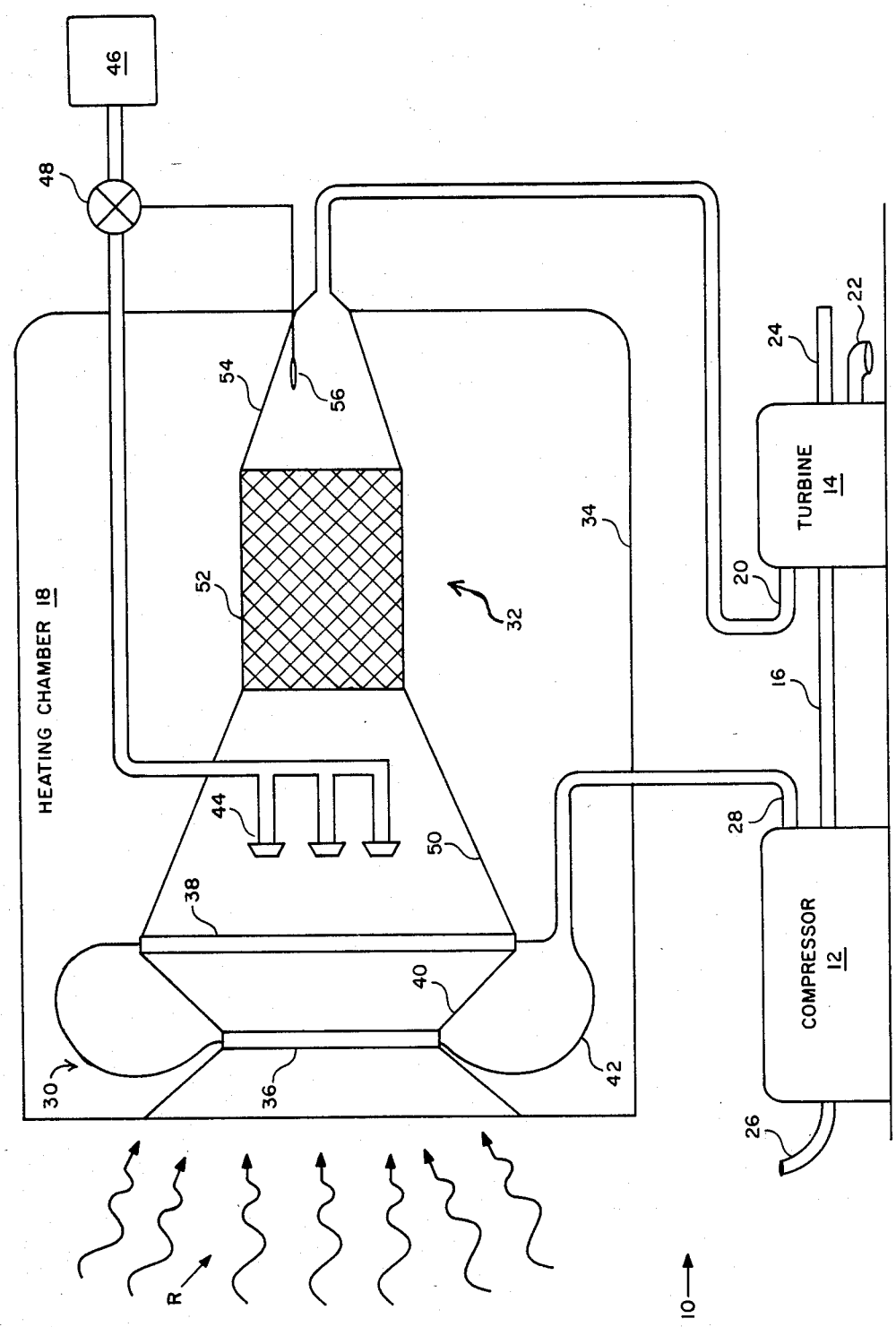

BRAYTON ENGINE BURNER

BACKGROUND OF THE INVENTION

1. Field of the Invention

The invention relates generally to the field of gas turbine plants, and more specifically to gas turbine plants which use solar energy to heat the gas flowing through the turbine before it is coupled to the turbine.

2. Description of the Prior Art

In recent years, solar energy has been applied to a wide range of uses, including domestic heating and hot water, using flat plate collectors, solar stills, and solar cookers, and so forth. In addition to the flat-plate collectors, solar receivers having various geometric shapes have been used to concentrate the received sunlight and thereby increase the temperatures from slightly over 100° Fahrenheit for flat-plate collectors into the thousands of degrees. For example, parabolic troughs and conical concentrators, which can receive sunlight and focus it onto a line or target, can generate temperatures in the 2000° to 3000° range, and paraboloids, which can concentrate the sunlight to a point target, have been known to generate temperatures in the 5000° to 6000° range.

Advances in solar energy technology have allowed solar receivers and collectors to be used in a number of industrial applications, such as in heat and steam engines and for generating electricity. However, because of variations in weather and air pollution, solar receivers may be shielded from the sun to varying extents for long periods of time, which can result in lowering power outputs as the amount of sunlight received by the receiver is reduced. Indeed, in some instances the amount of sunlight reaching the receiver may be so reduced that operation of the equipment may be impractical or impossible. Indeed, it normally is impossible to run these devices at night. Accordingly, the usefulness of solar receivers has been limited.

In some cases it would be possible to provide an auxiliary power source in addition to the solar receiver to boost the power output when sufficient sunlight is not available. However, this can be quite expensive. Furthermore, for the majority of the time that enough sunlight is available, it can supply the vast majority of the energy required, and the incremental amount required from an auxiliary energy supply may be so low as to keep the auxiliary supply from operating efficiently if at all. For example, in gas turbine operation it may be desirable to provide an auxiliary energy supply, typically using fossil fuels, should sunlight be insufficient to power the turbine. However, the amount of energy required would often be so small that not enough fuel would be needed to allow a high enough concentration for combustion.

SUMMARY

It is therefore an object of this invention to provide a new and improved auxiliary energy supply for a solar energy receiver.

It is another object of the invention to provide a new and improved apparatus for supplying energy to a gas turbine plant that incorporates the use of a solar receiver and that overcomes problems associated with variations in the amount of solar radiation received.

In brief summary, a new gas turbine plant or other power-supplying device makes use of a solar receiver to heat gas, such as air, to supply a portion of the energy required by the plant. In addition, a fuel heater is provided to accommodate changes in the amount of solar radiation received, and the corresponding variations in the amount of energy received from the sun. The fuel heater is situated downstream of the solar receiver and receives the heated gas therefrom. If additional energy is required, the fuel heater injects a fuel, such as methane, propane, alcohol, or the like, into the gas stream and reacts it with air to increase the temperature of the air. The heated air then is coupled to the turbine to provide a mechanical output.

The fuel is sprayed into the air stream downwstream of the solar receiver through a set of nozzles, and a catalyst, such as platinum or palladium, on a honeycombed substrate, causes the fossil fuel to react with oxygen in the air. This reaction supplies additional heat to the air stream that is then coupled to the turbine. The amount of fuel sprayed into the air stream may depend on the temperature of the air flow at the input of the turbine, or it can be a function of the power output from the turbine itself.

As an alternative to using fuel nozzles downstream of the solar receiver, the nozzles may spray fuel into the air stream ahead of the solar receiver. Since the solar receiver causes some turbulence in the air flowing through the receiver, the receiver can be used to insure a thorough mixing of the fuel in the air stream prior to flowing through the catalyst. If this alternative is used, however, care should be taken to prevent any catalytic materials from being used in the solar receiver, since receiver efficiency may be sensitive to the heat caused by any reaction with the fuel.

BRIEF DESCRIPTION OF THE DRAWINGS

This invention is pointed out with particularity in the appended claims. The above and further objects and advantages of this invention may be better understood by referring to the following description taken in conjunction with the accompanying drawing, which depicts a plan view of a gas turbine plant embodying the principles of the invention.

DESCRIPTION OF AN ILLUSTRATIVE EMBODIMENT

With reference to the sole FIGURE, a gas turbine plant 10, otherwise known as a "Brayton engine" because it follows an open or "Brayton" thermodynamic cycle, comprises a compressor 12 and turbine 14 mechanically connected by a shaft 16, which transmits rotational force from turbine 14 to compressor 12, and by a heating chamber 18, which receives compressed air from compressor 12, heats it, and couples it to turbine 14. In a well-known manner, a turbine 14 receives hot air from a pipe 20 and expels it through an outlet 22. Internal to turbine 14 in the air flow path between inlet 20 and outlet 22 is a conventional gas turbine having blades mounted on a rotatable shaft which rotates in response to air flowing through the blades, thereby providing a rotational output on shaft 24, and coincidentally on shaft 16.

Compressor 12 also includes an air inlet 26 for receiving a gas such as air, and a set of turbine blades. The turbine blades are connected to shaft 16 and are forced to rotate thereby to draw in air through air inlet 26, and expel compressed air through pipe 28 to heating chamber 18.

As has been mentioned, heating chamber 18 receives compressed air from compressor 12 through pipe 28, heats the air and delivers the heated air through pipe 20 to turbine 14. In accordance with the invention, heating chamber 18 comprises an upstream portion constituting a solar receiver 30, and a downstream portion constituting a fuel heat generator 32, both situated in a common housing 34. The solar receiver 30 receives solar radiation, depicted by arrows R, through glass window 36, which concentrates the solar energy on absorber 38. Window 36 and absorber 38 are spaced apart and held separated by a conical member 40 which has perforations to allow air to enter from a toroid-shaped air distributor 42. Distributor 42 in turn is connected to pipe 28 to receive compressed air from compressor 12. The distributor 42 serves to distribute the compressed air from compressor 12 around the solar receiver, to insure an even pressure distribution of air that is forced into solar receiver 30.

Downstream of solar receiver 30 in heating chamber 18 is a set of nozzles 44 that receive a fuel such as kerosene, methane, propane, alcohol or the like from a reservoir 46 through a valve 48. The nozzles 44 are situated in a combustion chamber defined by a conical housing 50, that also maintains a combustion catalyst 52 in spaced apart relation from solar absorber 38. Combustion catalyst 52, in one specific embodiment, comprises a honeycombed substrate material on which has been deposited a catalyst that causes the fuel ejected from nozzles 44 to react with the air flowing through the heating chamber 18. Appropriate known catalysts include platinum or palladium, which cause many fossil fuels to react with oxygen in the air, although any other catalyst which can cause the selected fuel to react with air can also be used. An appropriate material for the honeycombed substrate is cordierite, or silicon carbide, although other materials having low coefficients of expansion could also be used.

A benefit of using a catalyst to promote combustion of the air and fuel is that often the amount of heat required to be added by the fuel is so small that a flame would not be supported by the small amount of fuel added to the air stream. The invention thus can be used in an extremely wide range of conditions varying from very low amounts of additional heat required in addition to the energy supplied by the solar receiver, to large amounts of additional heat.

After passing through catalytic burner 52, the air and products of combustion then flow downstream through a funnel portion 54 that collects the gases and cause them to flow into pipe 20, and from there into turbine 14.

The amount of fuel supplied from reservoir 46 to nozzles 44 can alternatively depend either on the temperature of the gas flowing from funnel 54 to turbine 14, or on the rotational power provided by output shaft 24. The FIGURE illustrates one arrangement in which a thermocouple 56 extends into the region of funnel 54. Thermocouple 56 controls valve 48 to regulate the amount of fuel that is supplied to nozzles 44.

In a suggested alternative control arrangement, a tachometer (not shown) may be used to sense the speed of rotation of output shaft 24. If the shaft's rotational speed drops, the valve 48 may be opened to increase the amount of fuel that flows from reservoir 46 to nozzle 44.

In an alternative arrangement by which fuel is injected into the air stream, the nozzles 44 may be situated upstream of the solar receiver. For example, the fuel may be injected into the air stream in compressor 12, in pipe 28 or through the walls of the air distributor 42. This could allow for a more even distribution of fuel throughout the air passing through heating chamber 18, and it may enable the distance between solar absorber 38 and combustion catalyst 52 to be reduced, thereby reducing the size of heating chamber 18.

The foregoing description is limited to a specific embodiment of this invention. It will be apparent, however, that the invention can be practiced in diverse arrangements than are described in this specification with the attainment of some or all of the foregoing objects and advantages of this invention. Accordingly, it is the object of the appended claims to cover all such variations and modifications as come within the true spirit and scope of this invention.

What is claimed as new and desired to be secured by Letters Patent of the United States is:

1. Apparatus for providing heated air to the inlet of a gas turbine having air inlet means for receiving air in a stream comprising:
    (a) solar collection means situated in said air inlet means for receiving sunlight and imparting heat energy to the airstream,
    (b) burner means situated in said air inlet means in series with said solar collection means for providing additional heat energy to the airstream, including
        (i) fuel injection means for injecting fuel into the airstream,
        (ii) catalyst means for reacting the fuel in the airstream with the air, and
        (iii) sensing means for sensing a parameter related to the operation of the turbine and for adjusting the flow of fuel in response thereto,
    (c) said solar collector means and said burner means disposed in a common housing forming a single heating chamber.

2. Apparatus as defined in claim 1 wherein the sensing includes temperature sensing means and means connected to said temperature sensing means for adjusting the flow of fuel to said fuel injection means so that the temperature of the inlet air is maintained constant.

3. Apparatus as defined in claim 1 wherein the burner means comprises nozzles for spraying fuel into the air from the solar collection means.

4. Apparatus as defined in claim 3 wherein said catalyst means comprises a cordierite honeycomb having a platinum coating, said platinum coating constituting the catalyst.

* * * * *